| (12) | United States Patent<br>Atsumi et al. | (10) Patent No.: US 9,238,485 B2<br>(45) Date of Patent: Jan. 19, 2016 |

(54) VEHICLE BODY LOWER STRUCTURE

(71) Applicant: TOYOTA JIDOSHA KABUSHIKI KAISHA, Toyota-shi (JP)

(72) Inventors: Hyuga Atsumi, Toyota (JP); Tetsuo Nuruki, Toyota (JP); Daisuke Teramoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/616,951

(22) Filed: Feb. 9, 2015

(65) Prior Publication Data

US 2015/0232127 A1    Aug. 20, 2015

(30) Foreign Application Priority Data

Feb. 14, 2014  (JP) ................................. 2014-026744

(51) Int. Cl.
*B62D 25/20*    (2006.01)

(52) U.S. Cl.
CPC ............ *B62D 25/2045* (2013.01); *B62D 25/20* (2013.01)

(58) Field of Classification Search
CPC .......................... B62D 25/20; B62D 25/2045
USPC ................... 296/193.07, 187.08, 204, 29, 30
See application file for complete search history.

(56) References Cited

U.S. PATENT DOCUMENTS

| 7,458,632 B2 * | 12/2008 | Yamada et al. ........... 296/193.07 |
| 8,485,591 B2 * | 7/2013 | Kihara et al. ............ 296/203.02 |
| 2012/0242113 A1 * | 9/2012 | Yasuhara et al. ......... 296/193.07 |

FOREIGN PATENT DOCUMENTS

| JP | 2002-362419 | 12/2002 |
| JP | 2007-153012 | 6/2007 |
| JP | 2010-228731 | 10/2010 |

* cited by examiner

*Primary Examiner* — Joseph D Pape

(74) *Attorney, Agent, or Firm* — Oblon, McClelland, Maier & Neustadt, L.L.P.

(57) ABSTRACT

A vehicle body lower structure includes: a floor connected to a dashboard panel, extending toward the vehicle rear side; a tunnel provided at a vehicle width direction center portion extending from the dashboard panel through the floor in the vehicle front-rear direction; a dashboard cross member joined to the dashboard panel, spanning in the vehicle width direction between a front end of the tunnel and a vehicle side section; and an under floor brace provided to a front end portion of the tunnel, extending in the vehicle width direction at the opposite side to the cabin, including both ends extending further toward the vehicle width direction outside than the front end portion of the tunnel and are fixed to the dashboard panel, the ends being located in positions facing vehicle width direction inside ends of the dashboard cross member via the dashboard panel.

8 Claims, 4 Drawing Sheets

VEHICLE BODY LOWER STRUCTURE

CROSS-REFERENCE TO RELATED APPLICATION

This application is based on and claims priority under 35 USC 119 from Japanese Patent Application No. 2014-026744 filed on Feb. 14, 2014, the disclosure of which is incorporated by reference herein.

BACKGROUND

1. Technical Field

The present invention relates to a vehicle body lower structure.

2. Related Art

Hitherto structures are proposed that prevent deformation of a vehicle lower side in the event of a collision (see, for example Japanese Patent Application Laid-Open (JP-A) Nos. 2002-362419, 2007-153012, and 2010-228731). A structure exists, for example, in which one end of a dashboard cross member is joined to a side face of a tunnel via a tunnel member, with the other end of the dashboard cross member joined to an A pillar. The tunnel member straddles an upper face of the tunnel and is joined to the tunnel (see, for example JP-A No. 2002-362419). In such a structure, rigidity of the tunnel is increased by the tunnel member, and when load toward the vehicle width direction inside is input to the dashboard cross member, the load is transmitted to the tunnel portion side.

However, vehicle cabin space is reduced by the above structure, and there is accordingly room for improvement regarding this point.

SUMMARY

In consideration of the above circumstances, the present disclosure provides a vehicle body lower structure that may prevent deformation of a tunnel when load is input to a dashboard cross member and may effectively transmit the load, while avoiding a reduction in vehicle cabin space.

An aspect of the present invention is a vehicle body lower structure including: a vehicle floor that is connected to a lower portion of a dashboard panel partitioning between a vehicle body front section and a vehicle cabin, and that extends toward the vehicle rear side; a tunnel that is provided at a vehicle width direction center portion extending from a lower rear face side of the dashboard panel through the vehicle floor, and that extends in the vehicle front-rear direction; a dashboard cross member that is joined to the lower rear face of the dashboard panel, and that spans in the vehicle width direction between a front end of a side wall of the tunnel and a frame member of a vehicle body side section; and an under floor brace that is provided to a front end portion of the tunnel, extending in the vehicle width direction at the opposite side to the vehicle cabin side, and that includes both vehicle width direction ends of the under floor brace extending further toward the vehicle width direction outside than the front end portion of the tunnel and are fixed to the dashboard panel, either directly or through another member, the vehicle width direction ends of the under floor brace being located in positions facing vehicle width direction inside ends of the dashboard cross member with the dashboard panel interposed therebetween.

In the above configuration, the dashboard cross member is joined to the lower rear face of the dashboard panel, and the dashboard cross member spans in the vehicle width direction between the front end of the side wall of the tunnel and the frame member of the vehicle body side section. The under floor brace is provided extending in the vehicle width direction to the front end portion of the tunnel at the opposite side to the vehicle cabin side. Both vehicle width direction ends of the under floor brace extend further toward the vehicle width direction outside than the front end portion of the tunnel, are fixed to the dashboard panel, either directly or through another member. The vehicle width direction ends of the under-floor brace are located in a position facing the vehicle width direction inside ends of the dashboard cross member with the dashboard panel interposed therebetween. This enables to provide a large vehicle cabin space, compared to a comparative structure in which, for example, both left and right ends of the dashboard cross member are joined to a frame member of the vehicle side section, and a vehicle width direction center portion of the dashboard cross member spans across an upper portion of the tunnel. Moreover, in the event of load toward the vehicle width direction inside input to the dashboard cross member during a collision, the under-floor brace braces and supports the tunnel, suppressing deformation of the tunnel.

In the above aspect, the dashboard cross member may include a first ridge line running along the vehicle width direction; and the under floor brace may include a second ridge line running along the vehicle width direction, the second ridge line having a vehicle width direction end at a position overlapping with the first ridge line as viewed in a direction in which the dashboard cross member and the under floor brace face each other.

In the above configuration, a vehicle width direction end of the second ridge line of the under-floor brace is located at a position overlapping with the first ridge line as viewed running along the vehicle width direction, and in the facing direction of the dashboard cross member and the under floor brace. In the event of load toward the vehicle width direction inside input to the dashboard cross member during a collision, therefore, the load is effectively transmitted in the vehicle width direction.

The above aspect may further include a pair of left and right under floor reinforcements provided at both vehicle width direction sides and at the vehicle lower side of the tunnel, the under floor reinforcements extending in the vehicle front-rear direction in a vehicle plan view and being joined to a lower portion of the dashboard panel and to the vehicle floor, wherein both vehicle width direction ends of the under floor brace are joined to the under floor reinforcements.

In the above configuration, the pair of left and right under floor reinforcements are provided at both vehicle width direction sides and at the vehicle lower side of the tunnel, extend in the vehicle front-rear direction in the vehicle plan view, and are joined to the lower portion of the dashboard panel and to the vehicle floor. Both vehicle width direction ends of the under floor brace are joined to the under floor reinforcements. In the event of load input to the dashboard cross member during a collision, therefore, part of the load is transmitted along the under-floor reinforcements toward the vehicle rear side.

In the above aspect, the under floor reinforcements may include a third ridge line running in the vehicle width direction at a front end portion of the under floor reinforcements, the third ridge line is located at a position overlapping the first ridge line and the second ridge line as viewed in the facing direction of the dashboard cross member and the under floor brace.

In the above configuration, the third ridge line runs along the vehicle width direction at a front end portion of the under floor reinforcements and is located in a position overlapping the first ridge line and the second ridge line as viewed in the facing direction of the dashboard cross member and the under floor brace. In the event of load input to the dashboard cross member during a collision, therefore, the load is effectively transmitted toward the vehicle rear side and toward the vehicle width direction.

The above aspect may further include a floor cross member that is extending in the vehicle width direction and is joined to an upper face of the vehicle floor at a vehicle front-rear direction intermediate portion of the upper face of the vehicle floor, wherein a front end portion of the under floor reinforcements is joined to the dashboard cross member with the dashboard panel interposed therebetween, and a rear end portion of the under floor reinforcements is joined to the floor cross member with the vehicle floor interposed therebetween.

In the above configuration, the floor cross member extends in the vehicle width direction and is joined to an upper face of the vehicle floor at a vehicle front-rear direction intermediate portion thereof. The front end portion of the under floor reinforcements is joined to the dashboard cross member via the dashboard panel, and the rear end portion of the under floor reinforcements is joined to the floor cross member via the vehicle floor. In the event of load input to the dashboard cross member during a collision, therefore, the load is effectively transmitted, since the dashboard cross member is supported by the floor cross member via the under-floor reinforcements.

As explained above, the vehicle body lower structure according to the present aspect enables tunnel deformation to be reduced and load to be effectively transmitted in the event of load input to the dashboard cross member, while avoiding a reduction in vehicle cabin space.

BRIEF DESCRIPTION OF DRAWINGS

Exemplary embodiments of the present invention will be described in detail based on the following figures, wherein.

DETAILED DESCRIPTION

Exemplary Embodiment Configuration

Figure 1:
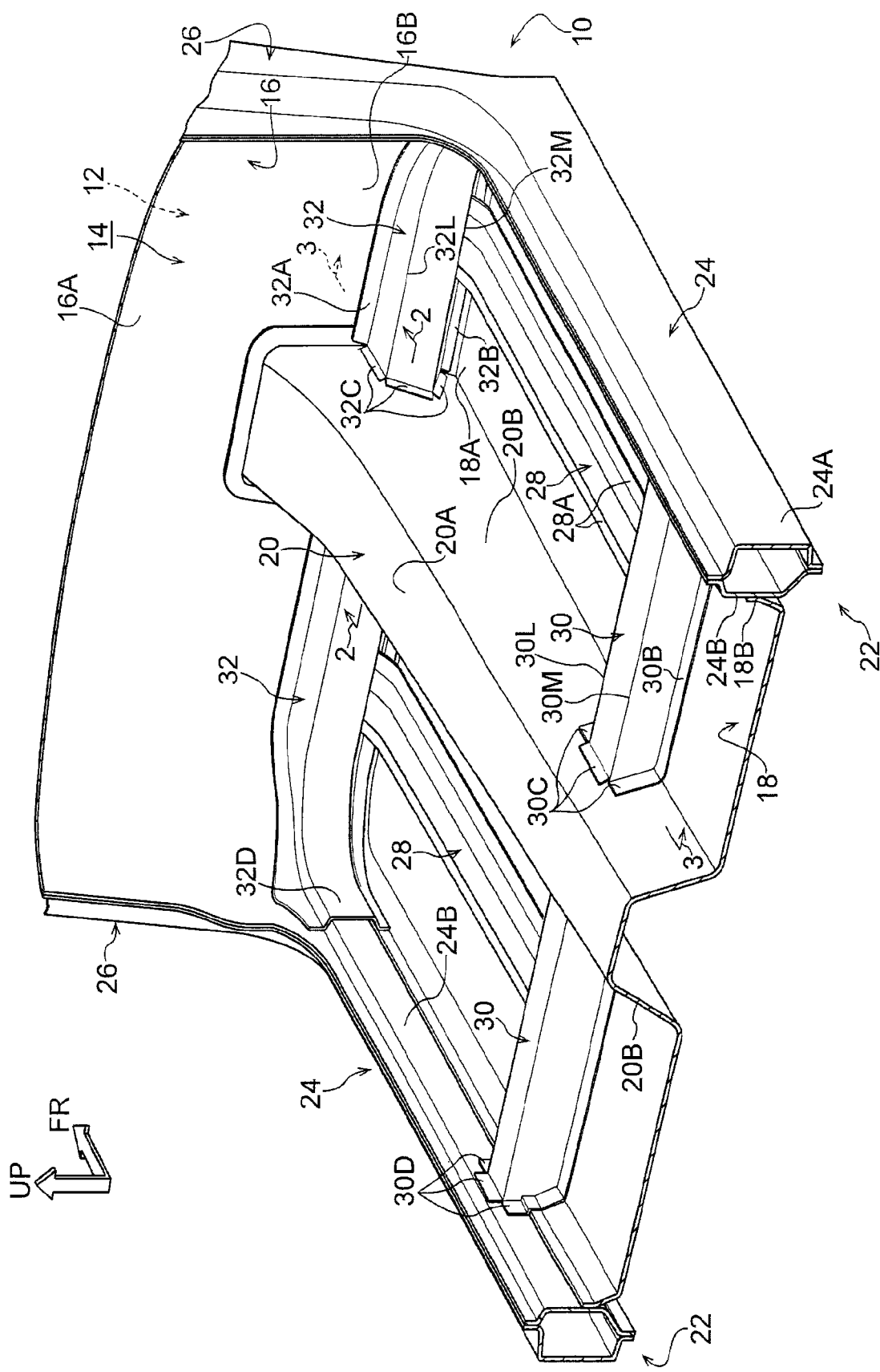
FIG. 1 is a perspective view illustrating a vehicle body lower structure according to an exemplary embodiment.

Explanation follows regarding a vehicle body lower structure according to an exemplary embodiment, with reference to FIG. 1 to FIG. 4. Note that in the drawings, the arrow FR indicates the vehicle front side, the arrow UP indicates the vehicle upper side, and the arrow W indicates the vehicle width direction.

Figure 2:
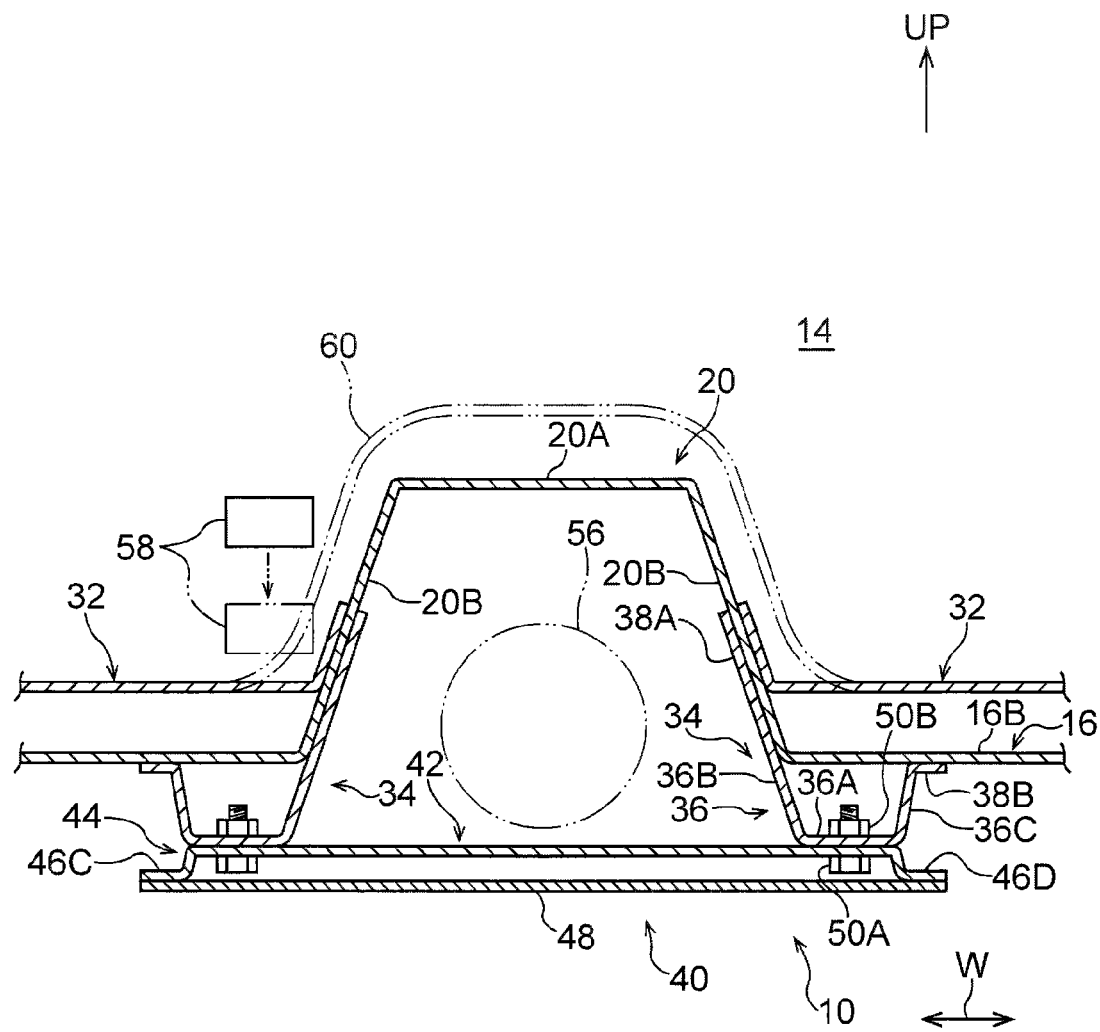
FIG. 2 is an enlarged cross-section taken along line 2-2 in FIG. 1.
Figure 3:
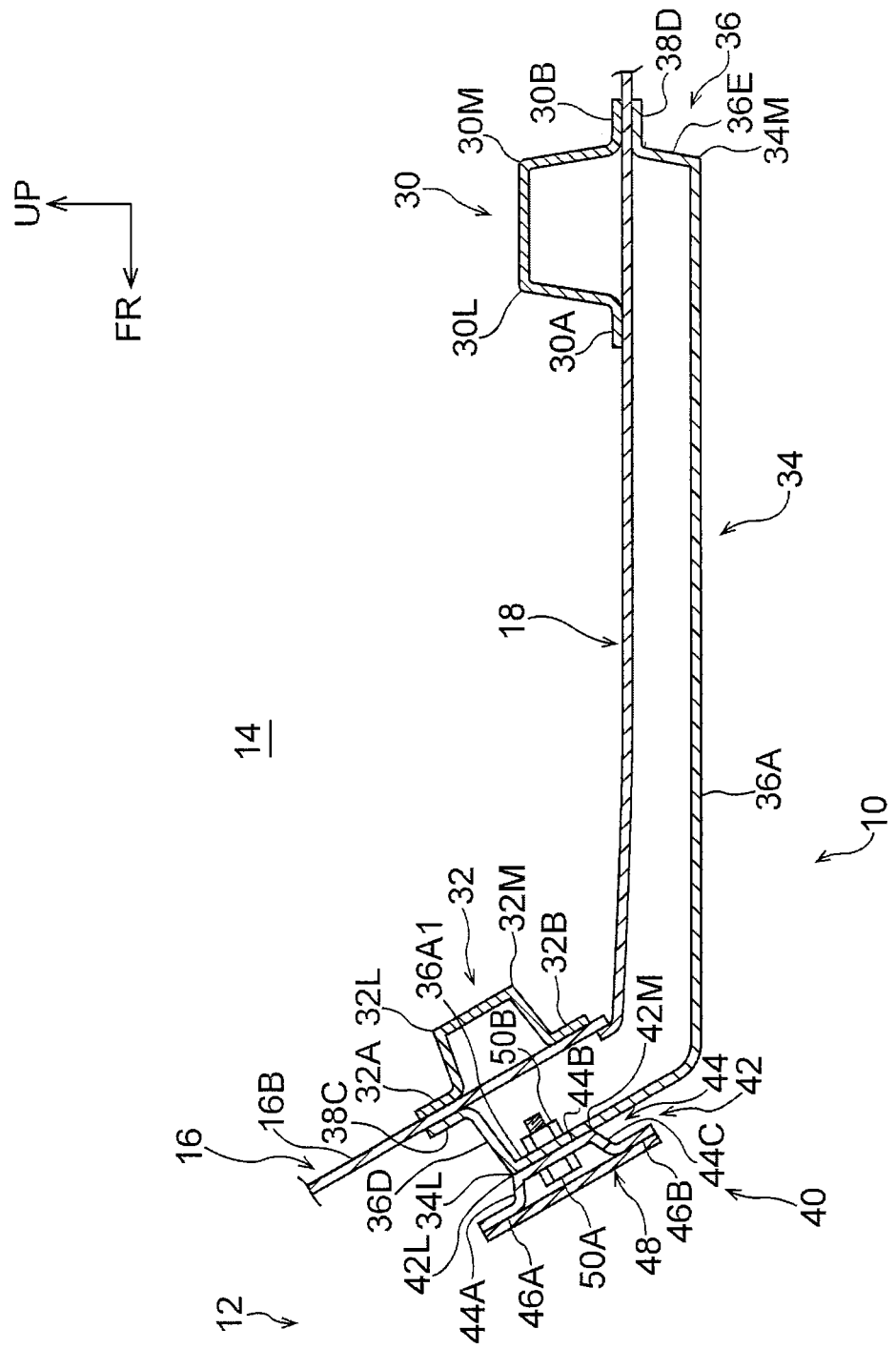
FIG. 3 is an enlarged cross-section taken along line 3-3 in FIG. 1.

FIG. 1 is a perspective view illustrating a vehicle body lower structure 10 according to the present exemplary embodiment. FIG. 2 is an enlarged cross-section taken along line 2-2 in FIG. 1, and FIG. 3 is an enlarged cross-section taken along line 3-3 in FIG. 1.

As illustrated in FIG. 1, a dashboard panel 16 (a passenger cabin front wall) partitions between a vehicle body front section 12 (an engine room) and a vehicle cabin 14. An upper portion of the dashboard panel 16 forms an upright panel 16A formed in a substantially upright plate shape, and a lower portion of the dashboard panel 16 forms a toe board 16B, integrally (continuously) provided to the upright panel 16A and formed in a sloping plate shape. The toe board 16B slopes toward the vehicle rear side on progression toward the vehicle lower side. A front end 18A of a vehicle floor 18 is joined as a single unit by welding or the like to a lower end portion of the toe board 16B. Namely, the vehicle floor 18 is connected to the lower portion of the dashboard panel 16 and extends toward the vehicle rear side. The vehicle floor 18 configures a floor of the vehicle cabin 14.

A tunnel 20 is provided at a vehicle width direction center section extending from a rear face side of the toe board 16B of the dashboard panel 16 through the vehicle floor 18. The tunnel 20 is formed in an inverted substantially U-shape open toward the vehicle lower side as viewed from the front of the vehicle body, includes an upper wall 20A and a pair of side walls 20B, and extends in the vehicle front-rear direction. The pair of side walls 20B are sloped walls sloping toward the vehicle width direction outside on progression from vehicle width direction outside ends of the upper wall 20A toward the vehicle lower side. In the present exemplary embodiment, as an example, a front end portion of the tunnel 20 is configured of the same material and with the same plate thickness as a general portion of the dashboard panel 16. An exhaust pipe 56 (see FIG. 2) extending in the vehicle front-rear direction is installed inside the tunnel 20.

A pair of left and right rockers (also referred to as side sills) 24, serving as frame members of vehicle body side sections 22, are provided at the vehicle width direction outside of the vehicle floor 18. The rockers 24 extend in the vehicle front-rear direction, and are each configured including an outer rocker 24A disposed at the vehicle width direction outside and an inner rocker 24B disposed at the vehicle width direction inside. The outer rocker 24A and the inner rocker 24B are formed with substantially hat shaped cross-sections open at sides facing each other, and respective pairs of upper and lower flanges are joined to each other by welding, thereby forming a closed cross-section extending in the vehicle front-rear direction. Terminal portions 18B at the vehicle width direction outside of the vehicle floor 18 are joined by welding to respective side faces at the vehicle width direction inside of the inner rockers 24B, in a state folded toward the vehicle upper side.

Front pillars 26 (A pillars) are installed extending from front end portions of the respective rockers 24 toward the vehicle upper side. Each front pillar 26 is a frame member of the respective vehicle body side section 22, and is configured including a closed cross-section portion extending in the vehicle up-down direction. A lower portion of the front pillar 26 is installed at the vehicle width direction outside of the dashboard panel 16.

Figure 4:
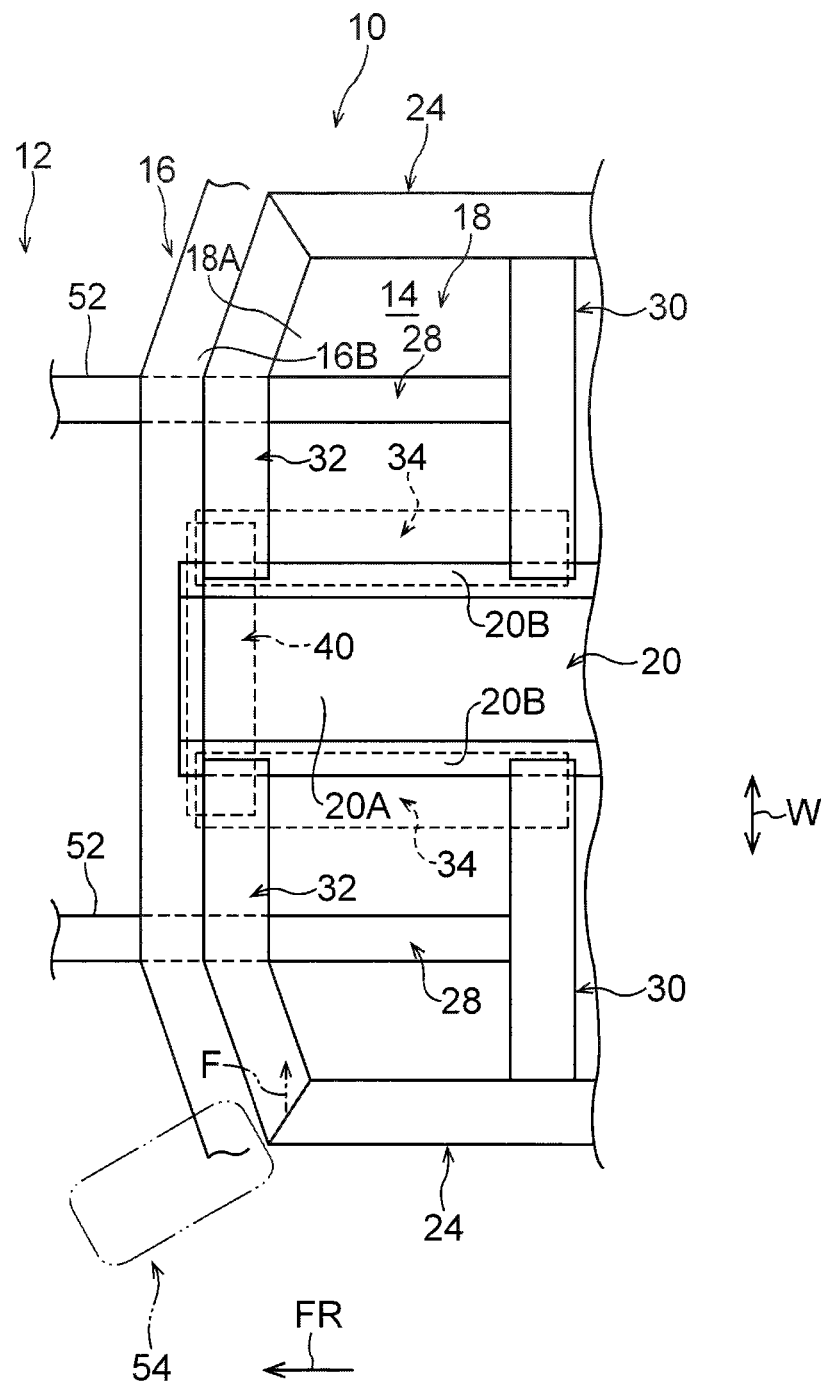
FIG. 4 is a schematic view illustrating a vehicle body lower structure according to the exemplary embodiment, in a state viewed diagonally from the vehicle rear upper side.

FIG. 4 is a schematic view illustrating the vehicle body lower structure 10 in a state viewed diagonally from the vehicle rear upper side. As illustrated in FIG. 4, front side members 52 extend in the vehicle front-rear direction at both sides of the vehicle body front section 12. Each front side member 52 includes a substantially rectangular shaped closed cross-section in a vehicle front view of the vehicle body front section 12, slopes along a lower face of the toe board 16B of the dashboard panel 16, and extends to a lower face side of the front end 18A of the vehicle floor 18. A rear portion of the front side member 52 is formed with a substantially hat shaped cross-section open toward the vehicle upper side, and a pair of left and right flanges (not illustrated in the drawings) are joined by welding to the respective lower faces of the toe board 16B and the front end 18A of the vehicle floor 18.

Under reinforcement (not illustrated in the drawings) is connected to a rear end portion of the front side member 52. The under reinforcement is formed with a substantially hat shaped cross-section open toward the vehicle upper side, extends in the vehicle front-rear direction, and a pair of left and right flanges are joined by welding to a lower face of the vehicle floor 18.

Reinforcing upper members 28 are disposed at the upper side of the respective rear end portions of the front side members 52 and front end portions of the under reinforcements, with the toe board 16B and the vehicle floor 18 interposed therebetween. Each upper member 28 is formed with a substantially hat shaped cross-section open toward the vehicle lower side, extends in the vehicle front-rear direction, and a pair of left and right flanges 28A (see FIG. 1) are joined by welding to an upper face of the vehicle floor 18.

As illustrated in FIG. 1, a vehicle front-rear direction intermediate portion of the tunnel 20 and vehicle front-rear direction intermediate portions of the rockers 24 are joined in the vehicle width direction by floor cross members 30. As an example, the floor cross members 30 are disposed slightly to the vehicle rear side of front seat seated occupant spaces. Each floor cross member 30 is formed with a substantially hat shaped cross-section open toward the vehicle lower side in a vehicle side view, extends in the vehicle width direction, and a pair of front and rear flanges, these being a front flange 30A (see FIG. 3) and a rear flange 30B, are joined by welding to a vehicle front-rear direction intermediate portion at the upper face of the vehicle floor 18. A closed cross-section portion is thereby formed by the floor cross member 30 and the vehicle floor 18, and the closed cross-section portion extends along the direction in which the tunnel 20 and the rocker 24 are coupled together by the floor cross member 30. Each floor cross member 30 includes a front side ridge line 30L running along the vehicle width direction at an upper face front edge thereof, and a rear side ridge line 30M running along the vehicle width direction at an upper face rear edge thereof.

Terminal flanges 30C are formed at vehicle width direction inside terminal portions of each of the floor cross members 30, by folding toward the outside of the inverted substantially U-shape cross-section. The terminal flanges 30C are joined by welding to respective outside faces of the side walls 20B of the tunnel 20. Terminal flanges 30D are formed at vehicle width direction outside terminal portions of each of the floor cross members 30, by folding toward the outside of the inverted substantially U-shape cross-section. The terminal flanges 30D are joined by welding to respective vehicle width direction inside faces of the inner rockers 24B.

The front end portion of the tunnel 20 and the front end portions of the rockers 24 are coupled in the vehicle width direction by dashboard cross members 32. Specifically, the pair of dashboard cross members 32 are disposed at left and right vehicle width direction sides of the tunnel 20, and span across in the vehicle width direction between respective front end portions of the side walls 20B of the tunnel 20 and the front end portions of the rockers 24. Each dashboard cross member 32 intersects with a front end portion of the upper member 28, and extends in the vehicle width direction from a vehicle width direction inside end of the dashboard cross member 32 to the location intersecting with the upper member 28. At a location further toward the vehicle width direction outside than the location intersecting with the upper member 28, the dashboard cross member 32 then extends while curving toward the vehicle rear side on progression toward the vehicle width direction outside.

Each dashboard cross member 32 is formed in a substantially hat shape, with a cross-section shape orthogonal to the extension direction open to either the vehicle body front section or the vehicle width direction outside. A pair of upper and lower flanges of the dashboard cross member 32, an upper flange 32A and a lower flange 32B, is joined by welding to the rear face of the toe board 16B of the dashboard panel 16. The dashboard cross member 32 and the dashboard panel 16 thereby form a closed cross-section portion, and the closed cross-section portion extends in the direction in which the tunnel 20 and the rocker 24 are coupled together by the dashboard cross member 32. The dashboard cross member 32 includes an upper side ridge line 32L serving as a first ridge line running along the vehicle width direction at an upper face rear edge thereof, and a lower side ridge line 32M running along the vehicle width direction at a lower face rear edge thereof.

A vehicle width direction inside terminal portion of each of the dashboard cross members 32 abuts the outside face of the side wall 20B of the tunnel 20. Terminal flanges 32C are formed at the vehicle width direction inside terminal portion of the dashboard cross member 32, by folding the cross-section outside of the inverted substantially U-shape. The terminal flanges 32C are joined by welding to the side wall 20B of the tunnel 20. Vehicle width direction outside terminal portions 32D of the dashboard cross members 32 overlap and are joined by welding to respective front end portions of the inner rockers 24B.

As illustrated in FIG. 4, a pair of left and right under floor reinforcements 34 are provided at both vehicle width direction sides and the vehicle lower side of the tunnel 20. The under floor reinforcements 34 extend in the vehicle front-rear direction in a vehicle plan view, and are joined to the lower faces of both the toe board 16B of the dashboard panel 16 and the vehicle floor 18.

As illustrated in FIG. 2, the under floor reinforcements 34 each include a protruding portion 36, formed with an inverted substantially U-shaped cross-section open toward the toe board 16B side of the dashboard panel 16 and the vehicle floor 18 side, as viewed in a vertical cross-section in the extension direction thereof (see FIG. 3). A bottom wall 36A of the protruding portion 36 is separated from and disposed facing the toe board 16B of the dashboard panel 16 and the vehicle floor 18 (see FIG. 3).

The protruding portion 36 includes an inside vertical wall 36B projecting out from a vehicle width direction inside end of the bottom wall 36A, and an outside vertical wall 36C projecting out from a vehicle width direction outside end of the bottom wall 36A. The inside vertical wall 36B slopes toward the vehicle width direction inside on progression away from the bottom wall 36A, and the outside vertical wall 36C slopes toward the vehicle width direction outside on progression away from the bottom wall 36A.

Each under floor reinforcement 34 includes a join portion 38A extending from an upper end portion of the inside vertical wall 36B, overlapping and joined by welding to an inside face of the side wall 20B of the tunnel 20. The under floor reinforcement 34 also includes an outside flange 38B bending from an upper end portion of the outside vertical wall 36C so as to extend toward the vehicle width direction outside. The outside flange 38B is joined by welding to the lower faces of both the toe board 16B of the dashboard panel 16 and the vehicle floor 18 (see FIG. 3). The under floor reinforcement 34 thereby forms a closed cross-section portion together with the toe board 16B of the dashboard panel 16 and the vehicle floor 18 (see FIG. 3), as viewed in the extension direction of the under floor reinforcement 34.

As illustrated in FIG. 3, a front portion of the under floor reinforcement 34 is bent diagonally upward toward the vehicle front side so as to run along the toe board 16B, and a front portion of the bottom wall 36A of the protruding portion 36 forms a front end sloping portion 36A1 sloping toward the vehicle upper side on progression toward the vehicle front side. A front wall 36D is formed projecting out from a front end portion (an upper end portion) of the front end sloping portion 36A1 toward the toe board 16B side. The front wall 36D slopes toward the vehicle upper side on progression away from the front end sloping portion 36A1. The front end portion of the under floor reinforcement 34 includes a front side ridge line 34L, serving as a third ridge line running along the vehicle width direction at an upper face front edge thereof, this being a boundary portion between the front wall 36D and the front end sloping portion 36A1.

The under floor reinforcement 34 includes a front flange 38C bending from an upper end portion (rear end portion) of the front wall 36D so as to extend toward the vehicle front side at an upward angle. The front flange 38C overlaps the lower face (front face) of the toe board 16B of the dashboard panel 16, and is disposed facing the upper flange 32A of the dashboard cross member 32, with the toe board 16B interposed therebetween. The front flange 38C of the under floor reinforcement 34, the toe board 16B of the dashboard panel 16, and the upper flange 32A of the dashboard cross member 32 are joined together by welding in a state in which the three members overlap each other. Namely, the front end portion of the under floor reinforcement 34 is joined to the dashboard cross member 32 with the toe board 16B of the dashboard panel 16 interposed therebetween.

The protruding portion 36 includes a rear wall 36E protruding out from a rear end portion of the bottom wall 36A toward the vehicle floor 18 side at a rear portion of the under floor reinforcement 34. The rear wall 36E slopes toward the vehicle body rear side on progression away from the bottom wall 36A. The rear end portion of the under floor reinforcement 34 includes a rear side ridge line 34M running along the vehicle width direction at a bottom face rear edge thereof, this being a boundary portion between the rear wall 36E and the bottom wall 36A. The rear side ridge line 34M of the under floor reinforcement 34 is located in a position overlapping the rear side ridge line 30M of the floor cross member 30 in a vehicle upper face view.

The under floor reinforcement 34 includes a rear flange 38D bending from an upper end portion of the rear wall 36E so as to extend toward the vehicle rear side. The rear flange 38D overlaps the lower face of the vehicle floor 18, and is disposed facing the rear flange 30B of the floor cross member 30 with the vehicle floor 18 interposed therebetween. The rear flange 38D of the under floor reinforcement 34, the vehicle floor 18, and the rear flange 30B of the floor cross member 30 are joined together by welding in a state in which the three members overlap each other. Namely, the rear end portion of the under floor reinforcement 34 is joined to the floor cross member 30 with the vehicle floor 18 interposed therebetween.

The under floor reinforcement 34, together with the toe board 16B of the dashboard panel 16 and the vehicle floor 18, accordingly form a closed cross-section portion in vehicle side view.

As illustrated in FIG. 2 and FIG. 4, an under floor brace 40 extending in the vehicle width direction is provided to the front end portion of the tunnel 20 at the opposite side to the vehicle cabin 14 side. Both vehicle width direction ends of the under floor brace 40 extend further to the vehicle width direction outside than the front end portion of the tunnel 20, and are fixed to the toe board 16B with the under floor reinforcements 34 interposed therebetween. Namely, the front end portion of the tunnel 20 is reinforced by the under floor reinforcements 34 and the under floor brace 40. The vehicle width direction ends of the under floor brace 40 are located at positions opposing vehicle width direction inside ends of the dashboard cross members 32, with the toe board 16B of the dashboard panel 16 interposed therebetween. In other words, in the present exemplary embodiment, both vehicle width direction ends of the under floor brace 40 are set in positions opposing the vehicle width direction inside ends of the dashboard cross members 32, with the toe board 16B of the dashboard panel 16 interposed therebetween. Detailed explanation follows regarding the under floor brace 40.

As illustrated in FIG. 3, the under floor brace 40 is a reinforcement member, in which a first panel 42 formed with a substantially hat shaped cross-section open diagonally toward the vehicle lower side and forwards in vehicle side view, and a second panel 48 blocking off the open side of the first panel 42 are joined. The first panel 42 includes a protruding portion 44 formed with a substantially U-shaped cross-section open toward the vehicle front lower side in vehicle side view. In the protruding portion 44, a rear end portion of an upper wall 44A and a rear end portion of a lower wall 44C are coupled together by a sloping wall 44B. The sloping wall 44B slopes toward the vehicle front side on progression toward the vehicle upper side.

The first panel 42 includes an upper side ridge line 42L serving as a second ridge line running along the vehicle width direction at a boundary portion between the upper wall 44A and the sloping wall 44B, and includes a lower side ridge line 42M running along the vehicle width direction at a boundary portion between the lower wall 44C and the sloping wall 44B. Both vehicle width direction ends of the upper side ridge line 42L are located in positions overlapping the respective upper side ridge lines 32L of the dashboard cross members 32, as viewed in the facing direction of the dashboard cross members 32 and the under floor brace 40.

The first panel 42 includes an upper flange 46A extending from a front end portion of the upper wall 44A toward the vehicle front side at an upward angle, and a lower flange 46B extending from a front end portion of the lower wall 44C toward the vehicle rear side at a downward angle. Since the upper flange 46A of the first panel 42 and an upper end portion of the second panel 48 are joined together by welding, and the lower flange 46B of the first panel 42 and a lower end portion of the second panel 48 are joined together by welding, the under floor brace 40 includes a closed cross-section portion extending in the vehicle width direction.

As illustrated in FIG. 2, the first panel 42 includes a pair of left and right flanges 46C, 46D projecting out from the opening end at both vehicle width direction ends of the protruding portion 44 in directions away from each other. Joining by welding the pair of left and right flanges 46C, 46D of the first panel 42 to both left and right ends of the second panel 48 provides the under floor brace 40 with a closed cross-section portion extending in a perpendicular direction to the cross-section in FIG. 2.

As illustrated in FIG. 3, both vehicle width direction ends of the sloping wall 44B of the first panel 42 of the under floor brace 40 overlap the respective front end sloping portions 36A1 of the under floor reinforcements 34 and are fastened together by bolts 50A and weld nuts 50B. Both vehicle width direction ends of the under floor brace 40 are thereby joined to the under floor reinforcements 34. The front side ridge lines 34L of the under floor reinforcements 34 previously described are located in positions in which the upper side ridge lines 32L of the dashboard cross members 32 overlap the upper side ridge line 42L of the under floor brace 40, as viewed in the facing direction of the dashboard cross members 32 and the under floor brace 40.

Exemplary Embodiment Operation and Advantageous Effects

Explanation follows regarding operation and effects of the above exemplary embodiment.

As illustrated in FIG. 4, in the event of a small overlap collision (a front face collision in which a collision load is input to the vehicle width direction outside of the front side members 52), a front wheel 54 sometimes collides with the front end portion of the rocker 24 from the front side angled toward the vehicle width direction outside. In such cases, a load F (lateral force) directed toward the vehicle width direction inside is input to the front end portion of the rocker 24, and a bending moment acts on the rocker 24 to attempt to fold the rocker 24 so as to protrude outward (i.e., to attempt to fold the vehicle front-rear direction intermediate portion of the rocker 24 so as to protrude out toward the vehicle width direction outside).

When this occurs in the present exemplary embodiment, even when the load F directed toward the vehicle width direction inside is input to the dashboard cross member 32 at one side of the pair of left and right dashboard cross members 32, the under floor brace 40 braces and supports to suppress deformation of the tunnel 20, and the load F is transmitted through the under floor brace 40 to the dashboard cross member 32 at the other side. By preventing deformation that bends the upper wall 20A of the tunnel 20 (see FIG. 2) into a shape protruding toward the vehicle upper side, a large reaction force can be generated by the dashboard cross members 32, enabling folding of the rocker 24 so as to protrude outward to be prevented.

Supplementary explanation follows using a comparison with a comparative structure. In a comparative structure in which both left and right ends of a dashboard cross member are joined to rockers (24), and a vehicle width direction center portion of the dashboard cross member span across (wrap around) an upper portion of a tunnel (20), as illustrated by the double-dotted dashed lines 60 in FIG. 2, for example, even when load directed toward the vehicle width direction inside is input to one side of the dashboard cross member, deformation of the tunnel (20) is suppressed. The comparative structure, therefore, is also capable of generating a large reaction force by the dashboard cross member, and preventing folding of the rocker (24) so as to protrude outward.

However, in the case of the above comparative structure, a cabin interior (14) space is reduced due to the dashboard cross member spanning across the upper portion of the tunnel (20). In particular, in the comparative structure, since space around the sides of the tunnel (20) is greatly reduced by part of the dashboard cross member, the operating space (operating trajectory) of an accelerator 58 may not be provided so as not to overlap with the placement position of the dashboard cross member.

In contrast thereto, in the present exemplary embodiment, since the dashboard cross members 32 do not span across the upper portion of the tunnel 20, and the under floor brace 40 is provided to the front end portion of the tunnel 20 at the opposite side to the vehicle cabin 14 side, a larger space can be provided for the vehicle cabin 14. The operating space of the accelerator 58 and the placement position of the dashboard cross member 32 may be according easily provided so as not to overlap with each other. Namely, a good configuration of the packaging (the layout of components, etc.) is enabled. Note that, in FIG. 2, the depressed accelerator 58 is illustrated by a double-dotted dashed line.

In the present exemplary embodiment, the upper side ridge line 42L of the under floor brace 40 illustrated in FIG. 3 runs along the vehicle width direction, and both vehicle width direction ends thereof are located in a position overlapping the upper side ridge lines 32L of the dashboard cross members 32, as viewed in the facing direction of the dashboard cross members 32 and the under floor brace 40. Therefore, in cases in which load directed toward the vehicle width direction inside is input to the dashboard cross member 32 at one side during a collision, the load is effectively transmitted in the vehicle width direction.

In the present exemplary embodiment, the pair of left and right under floor reinforcements 34 illustrated in FIG. 2 are joined to the toe board 16B of the dashboard panel 16 and the vehicle floor 18 (see FIG. 1), and both vehicle width direction ends of the under floor brace 40 are joined to the under floor reinforcements 34. Therefore, when the load F is input to the dashboard cross member 32 as illustrated in FIG. 4 during a collision, a portion of the load is transmitted along the under floor reinforcement 34 toward the vehicle rear side.

In the present exemplary embodiment, the front side ridge line 34L at the front end portion of each of the under floor reinforcements 34 as illustrated in FIG. 3 runs along the vehicle width direction, and is located at a position overlapping the upper side ridge line 32L of the dashboard cross member 32 and the upper side ridge line 42L of the under floor brace 40, as viewed in the facing direction of the dashboard cross members 32 and the under floor brace 40. Therefore, when load is input to the dashboard cross member 32 during a collision, the load is effectively transmitted toward the vehicle rear side and transmitted in the vehicle width direction.

In the present exemplary embodiment, as illustrated in FIG. 4, the front end portions of the under floor reinforcements 34 are joined to the dashboard cross members 32 with the dashboard panel 16 interposed therebetween, and the rear end portions of the under floor reinforcements 34 are joined to the floor cross members 30 with the vehicle floor 18 interposed therebetween. Therefore, when load is input to the dashboard cross member 32 during a collision, load is effectively transmitted, since the dashboard cross member 32 is supported by the floor cross member 30 through the under floor reinforcement 34.

As explained above, the vehicle lower structure 10 according to the present exemplary embodiment enables deformation of the tunnel 20 to be prevented when load is input to the dashboard cross member 32, and the load to be effectively transmitted, while avoiding a reduction in the vehicle cabin 14 space, as illustrated in FIG. 1 to FIG. 3.

Exemplary Embodiment Supplementary Explanation

As a modified example of the above exemplary embodiment, a dashboard cross member joined to a lower rear face of the dashboard panel (16) may span across in the vehicle width direction between the front end portions of the side walls (20B) of the tunnel (20), and other frame members such as the front pillars (26) serving as frame members of the vehicle body side sections (22).

As another modified example of the above exemplary embodiment, instead of the configuration in the above exemplary embodiment, the front end portion of the tunnel (20) may be configured as a member formed of a material with a higher strength, or a member with a thicker set plate thickness than the general portion of the dashboard panel (16).

As another modified example of the above exemplary embodiment, a configuration may be adopted in which vehicle width direction ends of the upper side ridge line (42L) of the under floor brace (40) are located in a position not overlapping the upper side ridge lines (32L) of the dashboard cross members (32), as viewed in the facing direction of the dashboard cross members (32) and the under floor brace (40).

As another modified example of the above exemplary embodiment, a configuration may be applied in which there are no under floor reinforcements 34, and both vehicle width direction ends of the under floor brace (40) are located in positions facing vehicle width direction inside ends of the pair of left and right dashboard cross members (32), with the dashboard panel (16) interposed therebetween, and directly fixed to the dashboard panel (16) by fastening bolts.

As another modified example of the above exemplary embodiment, a configuration may be adopted in which the front side ridge lines (34L) of the under floor reinforcements (34) are located in positions that are not overlapping either one or both of the upper side ridge lines (32L) of the dashboard cross members (32) and the upper side ridge line (42L) of the under floor brace (40), as viewed in the facing direction of the dashboard cross members (32) and the under floor brace (40).

As another modified example of the above exemplary embodiment, a configuration may be adopted in which the front end portions of the under floor reinforcements (34) are not joined to the dashboard cross members (32) with the dashboard panel (16) interposed therebetween. Moreover, a configuration may be adopted in which the rear end portions of the under floor reinforcements (34) are not joined to the floor cross members (30) with the vehicle floor (18) interposed therebetween.

As illustrated in FIG. 2 and FIG. 3, in the above exemplary embodiment, the under floor brace 40 is a member in which the first panel 42 and the second panel 48 are joined; however, the under floor brace may be another under floor brace, for example, such as that configured by a cylindrical shaped member or a plate shaped member.

In the above exemplary embodiment, the pair of left and right dashboard cross members 32 are provided; however, only one left or one right dash cross member, for example, may be provided (namely, only at the vehicle left side, or only at the vehicle right side of the lower rear face of the dash panel).

Note that the above exemplary embodiment and plural modified examples may be implemented in any combination as needed.

Explanation has been given regarding one exemplary embodiment; however the exemplary embodiments are not limited to the above, and obviously various modifications other than those described above may be implemented within a range not departing from the spirit of the present disclosure.

What is claimed is:

1. A vehicle body lower structure comprising:
   a vehicle floor that is connected to a lower portion of a dashboard panel partitioning between a vehicle body front section and a vehicle cabin, and the vehicle floor extends toward the vehicle rear side;
   a tunnel that is provided at a vehicle width direction center portion extending from a lower rear face side of the dashboard panel through the vehicle floor, and the tunnel extends in the vehicle front-rear direction;
   a dashboard cross member that is joined to the lower rear face of the dashboard panel, and the dashboard cross member spans in the vehicle width direction between a front end of a side wall of the tunnel and a frame member of a vehicle body side section; and
   an under floor brace that is provided at a front end portion of the tunnel, extending in the vehicle width direction at an opposite side to a vehicle cabin side, and that includes both vehicle width direction ends of the under floor brace extending further toward the vehicle width direction outside than the front end portion of the tunnel and are fixed to the dashboard panel, the vehicle width direction ends of the under floor brace being located in positions facing vehicle width direction inside ends of the dashboard cross member with the dashboard panel interposed therebetween.

2. The vehicle body lower structure of claim 1, wherein:
   the dashboard cross member includes a first ridge line running along the vehicle width direction; and
   the under floor brace includes a second ridge line running along the vehicle width direction, the second ridge line having a vehicle width direction end at a position overlapping with the first ridge line as viewed in a direction in which the dashboard cross member and the under floor brace face each other.

3. The vehicle body lower structure of claim 1, further comprising a pair of left and right under floor reinforcements provided at left and right vehicle width direction sides and at a vehicle lower side of the tunnel, the under floor reinforcements extending in the vehicle front-rear direction in a vehicle plan view and being joined to a lower portion of the dashboard panel and to the vehicle floor,
   wherein both vehicle width direction ends of the under floor brace are joined to the under floor reinforcements.

4. The vehicle body lower structure of claim 2, further comprising a pair of left and right under floor reinforcements provided at left and right vehicle width direction sides and at a vehicle lower side of the tunnel, the under floor reinforcements extending in the vehicle front-rear direction in a vehicle plan view and being joined to a lower portion of the dashboard panel and to the vehicle floor,
   wherein both vehicle width direction ends of the under floor brace are joined to the under floor reinforcements.

5. The vehicle body lower structure of claim 4, wherein the under floor reinforcements include a third ridge line running in the vehicle width direction at a front end portion of the under floor reinforcements, the third ridge line is located at a position overlapping the first ridge line and the second ridge line as viewed in the facing direction of the dashboard cross member and the under floor brace.

6. The vehicle body lower structure of claim 3, further comprising a floor cross member that is extending in the vehicle width direction and is joined to an upper face of the vehicle floor at a vehicle front-rear direction intermediate portion of the upper face of the vehicle floor,
   wherein a front end portion of the under floor reinforcements is joined to the dashboard cross member with the dashboard panel interposed therebetween, and a rear end portion of the under floor reinforcements is joined to the floor cross member with the vehicle floor interposed therebetween.

7. The vehicle body lower structure of claim 4, further comprising a floor cross member that is extending in the vehicle width direction and is joined to an upper face of the vehicle floor at a vehicle front-rear direction intermediate portion of the upper face of the vehicle floor,
   wherein a front end portion of the under floor reinforcements is joined to the dashboard cross member with the dashboard panel interposed therebetween, and a rear end portion of the under floor reinforcements is joined to the floor cross member with the vehicle floor interposed therebetween.

8. The vehicle body lower structure of claim 5, further comprising a floor cross member that is extending in the vehicle width direction and is joined to an upper face of the vehicle floor at a vehicle front-rear direction intermediate portion of the upper face of the vehicle floor,
    wherein a front end portion of the under floor reinforcements is joined to the dashboard cross member with the dashboard panel interposed therebetween, and a rear end portion of the under floor reinforcements is joined to the floor cross member with the vehicle floor interposed therebetween.

\* \* \* \* \*